(12) United States Patent
Cohen

(10) Patent No.: US 6,761,615 B2
(45) Date of Patent: Jul. 13, 2004

(54) IN-SITU WEAR MEASUREMENT APPARATUS FOR DICING SAW BLADES

(75) Inventor: Motty Cohen, Zichron Yaacov (IL)

(73) Assignee: Advanced Dicing Technologies, Ltd., Haifa (IL)

( * ) Notice: Subject to any disclaimer, the term of this patent is extended or adjusted under 35 U.S.C. 154(b) by 0 days.

(21) Appl. No.: 10/001,154

(22) Filed: Nov. 1, 2001

(65) Prior Publication Data

US 2003/0082995 A1 May 1, 2003

(51) Int. Cl.[7] ................................................. B24B 1/00
(52) U.S. Cl. ............................ 451/6; 451/10; 451/11; 451/21; 83/62.1
(58) Field of Search ........................... 451/6, 8, 10, 11, 451/21; 83/62, 62.1; 125/2

(56) References Cited

U.S. PATENT DOCUMENTS

| | | | |
|---|---|---|---|
| 5,031,360 A | * | 7/1991 | Farnworth et al. |
| 5,353,551 A | | 10/1994 | Nishida |
| 5,433,649 A | | 7/1995 | Nishida |
| 5,718,615 A | | 2/1998 | Boucher et al. |

FOREIGN PATENT DOCUMENTS

| | | |
|---|---|---|
| DE | 69205786 | 12/1995 |
| EP | 0532933 A1 | 3/1993 |
| EP | 0532933 B1 | 11/1995 |
| JP | 2250769 | 10/1990 |
| JP | 6196556 | 7/1994 |
| JP | 994820 | 4/1997 |
| JP | 2967618 | 10/1999 |
| JP | 2000146529 | 5/2000 |

\* cited by examiner

Primary Examiner—Eileen P. Morgan
(74) Attorney, Agent, or Firm—RatnerPrestia

(57) ABSTRACT

An in-situ method and apparatus for monitoring wear of a dicing saw blade. The apparatus, which is mounted on a cooling block of the dicing saw, has a transmitter to emit a parallel beam of light onto a side surface of the dicing saw blade; a receiver for receiving the light that is un-obscured by the saw blade; and a processor coupled to the receiver for determining wear of the saw blade based on an output from the receiver. The apparatus may also display the wear rate of the saw blade, and/or an estimated time for replacement of the saw blade.

22 Claims, 6 Drawing Sheets

IN-SITU WEAR MEASUREMENT APPARATUS FOR DICING SAW BLADES

FIELD OF THE INVENTION

This invention relates generally to the dicing of semiconductor wafers, substrates and hard materials. More specifically, the present invention relates to an in-situ system and method to monitor and measure the wear of dicing saw blades used to dice hard material substrates.

BACKGROUND OF THE INVENTION

Die separation, or dicing, by sawing is the process of cutting a substrate into its individual circuit die with a rotating circular abrasive saw blade. This process has proven to be the most efficient and economical method in use today. It provides versatility in selection of depth and width (kerf) of cut, as well as selection of surface finish, and can be used to saw either partially or completely through a wafer or substrate.

FIG. 1 is an isometric view of a semiconductor wafer 100 during the fabrication of semiconductor devices. A conventional semiconductor wafer 100 may have a plurality of chips, or dies, 100a, 100b, ... formed on its top surface. In order to separate the chips 100a, 100b, ... from one another and the wafer 100, a series of orthogonal lines or "streets" 102, 104 are cut into the wafer 100. This process is also known as dicing the wafer.

Dicing saw blades are made in the form of an annular disc that is either clamped between the flanges of a hub or built on a hub that accurately positions the thin flexible saw blade. The blade is rotated by an integrated spindle-motor to cut into the workpiece.

Wafer dicing technology has progressed rapidly, and dicing is now a mandatory procedure in most front-end semiconductor packaging operations. It is used extensively for separation of die on silicon integrated circuit wafers.

Increasing use of microelectronic technology in microwave and hybrid circuits, memories, computers, defense and medical electronics has created an array of new and difficult problems for the industry. More expensive and exotic materials, such as sapphire, garnet, alumina, ceramic, glass, quartz, ferrite, piezo-electric materials (PZT), alumina ($Al_2O_3$) and other hard, brittle substrates, are being used mainly due to the exploding markets in optical communication components and telecommunications. In addition to these relatively new markets, the traditional markets for hard materials, such as, sensors, automotive components, ceramic ball grid array (CGBA), capacitors, and PZT based surface acoustic wave filters and ultrasound transducers are all exhibiting high growth rates in recent years.

Dicing hard materials is a challenge for the dicing industry. In order to maintain high dicing quality, namely, low top and backside chipping, along with reasonable throughput, the use or resinoid blades is desirable. A resinoid blade has a soft resin based matrix acting as a binder of the diamond particles which, in turn, perform the abrasive dicing process.

Relative to nickel binder type blades, predominately used in the dicing process of integrated circuits, resinoid blades have a blade wear rate that is larger than that of nickel binder type blades by at least an order of magnitude. Although blade wear is application dependent, an example may be useful to illustrate this point. For a resinoid blade used in dicing a glass type substrate, the blade wear is about five micron/meter of dicing length. By contrast, for a nickel binder type blade, used in dicing silicon IC wafers the blade wear is about 0.1 micron (or less) per meter of dicing length.

Conventional methods of monitoring dicing saw blade wear are time consuming. As such, where high blade wear exists processing throughput is significantly reduced. In one such conventional contact method, a blade wear station, based on measuring the height of the blade, is incorporated in the dicing area of the machine. To accomplish this method 1) the height station and the blade tip are brought on top of each other (height station below saw blade tip) through motion in the X-Y plane; 2) the blade is gradually lowered along the z-axis into the height station; 3) the blade tip is brought into contact with the height station sensor to determine the amount of wear of the blade; and 4) the height station and blade are separated from one another and dicing continues. This method is illustrated in U.S. Pat. No. 5,718,615 to Boucher et al.

In another conventional non-contact method, Step 3) above is modified such that the side of the blade interrupts the path of a light source projected between two prisms to determine the height of the blade and thereby the position of the end of the blade. This method is illustrated in U.S. Pat. Nos. 5,353,551 and 5,433,649 to Nishida.

The prior art is deficient, however, in that the conventional methods are time consuming since the blade and height monitoring station must be moved in X, Y and Z directions relative to one another to begin the height measuring process and then separated from one another after the blade wear is determined. It is estimated that this process lasts a minimum of 15 seconds, thereby significantly impacting device throughput, particularly in applications where large blade wear is present.

There is a need to monitor blade wear during wafer or substrate dicing for optimizing the dicing process and maintaining a high cut quality so as not to damage the substrate, often containing electronic chips or optoelectronic devices valued in the many thousands of dollars. There is also a need to perform fast monitoring so as to reduce cost of ownership.

SUMMARY OF THE INVENTION

In view of the shortcomings of the prior art, it is an object of the present invention to help optimize the monitoring of dicing saw blade wear.

The present invention is a device mounted on a cooling block and a spindle of a dicing saw for monitoring dicing saw blade wear. The device has a transmitter to emit light onto a side surface of the saw blade and a receiver for receiving a portion of the light not blocked by the saw blade.

According to another aspect of the invention, a processor is coupled to the receiver for determining wear of the saw blade based on an output from the receiver.

According to still another aspect of the invention, a photoelectric sensor is used to sense the wear of the saw blade.

According to yet another aspect of the present invention, predicted wear of the blade is determined and communicated to the operator and/or control center.

According to a further aspect of the invention, the wear rate of the saw blade and/or an estimated time for replacement of the saw blade may be communicated to the operator or control center.

These and other aspects of the invention are set forth below with reference to the drawings and the description of exemplary embodiments of the invention.

BRIEF DESCRIPTION OF THE DRAWINGS

The invention is best understood from the following detailed description when read in connection with the accompanying drawing. It is emphasized that, according to common practice, the various features of the drawing are not to scale. On the contrary, the dimensions of the various features are arbitrarily expanded or reduced for clarity. Included in the drawing are the following Figures.

DETAILED DESCRIPTION

Figure 1:
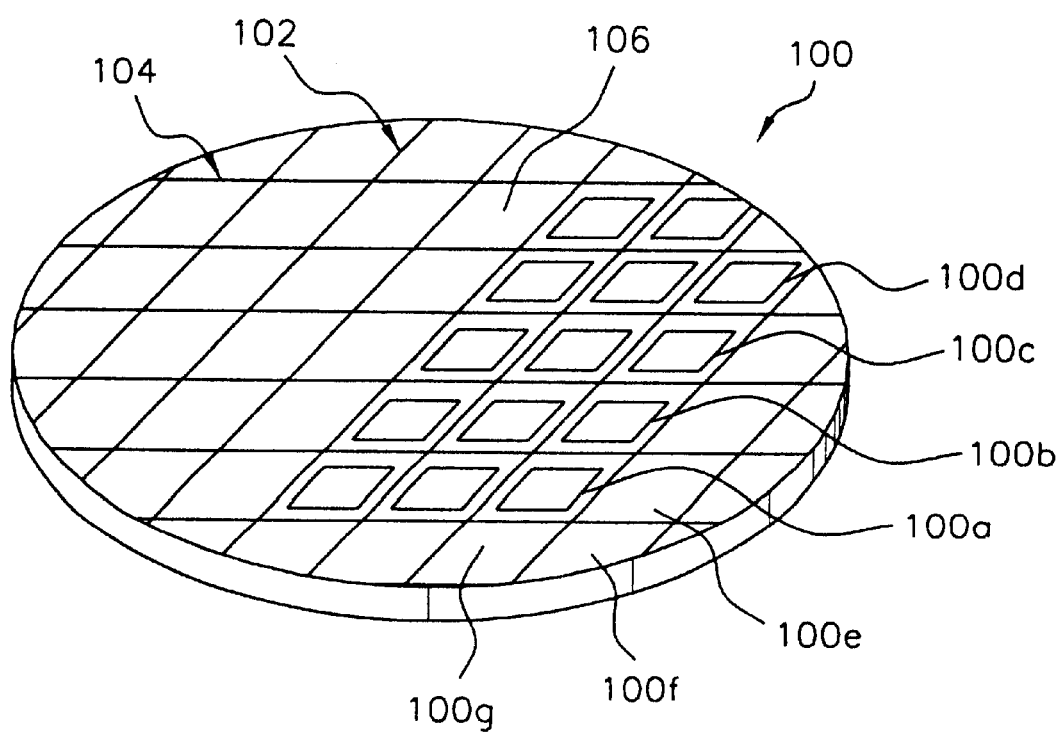
FIG. 1 is an isometric view of a semiconductor wafer used to form semiconductor devices.
Figure 2:
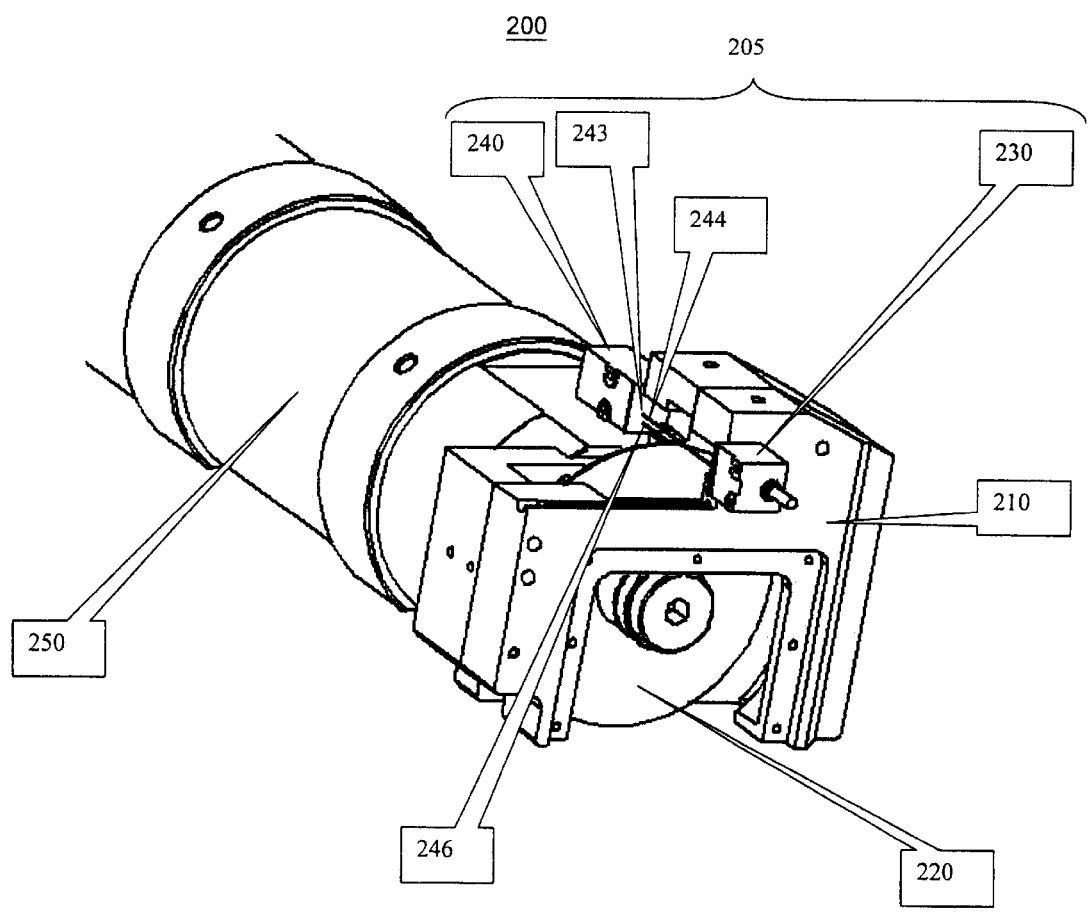
FIG. 2 is a perspective view of an exemplary embodiment of the present invention.

Referring to FIG. 2, an exemplary embodiment of the present invention is shown. In FIG. 2, a portion of dicing machine 200 is shown in which saw blade 220, mounted to spindle 250, is used to cut a workpiece (not shown in this figure). Adjacent saw blade 220 is blade housing 210 which also functions as a cooling block. Mounted on cooling block 210 is receiver 230, which is part of the blade wear monitoring system 205. As shown in FIG. 2, receiver 230 is fixedly disposed adjacent saw blade 220 on one side, while transmitter 240 is fixedly mounted on spindle 250 and disposed on an opposite side of saw blade 220. The invention is not so limited, however, in that the location of receiver 230 and transmitter 240 may be interchanged as desired, such that the receiver 230 is mounted on spindle 250 and transmitter 240 is mounted on cooling block 210.

In the exemplary embodiment, saw blade 220 and blade wear monitoring system 205 are not moved relative to one another during dicing operations in order to determine the wear of saw blade 220. As such, the time required to perform this important step during the dicing process is significantly reduced over that of the prior art, thereby increasing process throughput.

Figure 3:
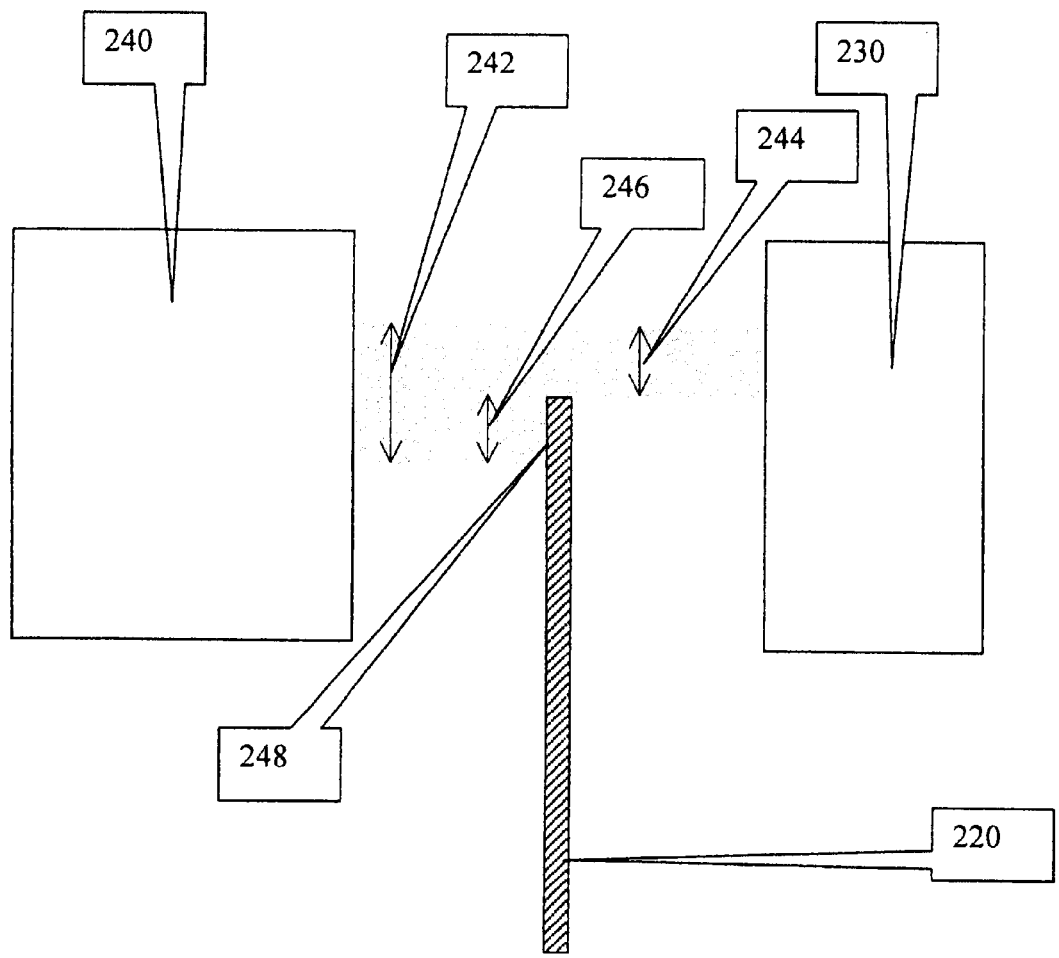
FIG. 3 is a partial side view of the exemplary embodiment of FIG. 2.

FIG. 3 is a side view of the blade wear monitoring system 200 according to a first exemplary embodiment of the present invention and illustrates certain details. In FIG. 3, transmitter 240 emits parallel light beams 242. Transmitter 240 has internal structure (not shown), including a light source (not shown), such as a laser diode, and an optical module (not shown) that reshapes the semiconductor laser beam to form a bundle of light having a substantially rectangular cross-section. In the exemplary embodiment, the rectangular cross-section is about 1 mm wide by about 10 mm high. Thus, parallel light beams 242 appear to be directly emitted from transmitter 240. Throughout the remainder of the specification, the optical module will be considered part of transmitter 240, for simplicity, and not separately referred to. Parallel light beams 242, in turn, are directed onto a side surface 248 of saw blade 220. In the exemplary embodiment, a light source (not shown) within transmitter 240, such as a diode laser, emits light in either the red and near infrared region of the spectrum, such as between 600 and 800 nm, and preferably about 780 nm. The invention is not so limited in that the wavelength of light may be selected based on the type of transmitter-receiver used.

As shown in FIG. 3, receiver 230 receives only a portion 244 of parallel light beams 242. The remaining portion 246 of parallel light beams 242 emitted by transmitter 240 is blocked by side surface 248 of the saw blade 220. This blocked portion of light 246 is indicative of the wear of saw blade 220. Receiver 230 has an internal structure (not shown), including a light-receiving element and a converging lens that focus the incoming light beam onto the light-receiving element surface. For simplicity, throughout the remainder of the specification, receiver 230 shall be considered as a whole and further reference to its internal structure is omitted.

In a preferred embodiment, light beams 242 are substantially parallel to the longitudinal axis of spindle 250 (shown in FIG. 2), or orthogonal to side surface 248 of blade 220. In one embodiment of the present invention, wear measuring device 205, includes a laser through beam photoelectric sensor, such as model LX2 manufactured by Keyence Corporation of Woodcliff Lake, N.J.

In the exemplary embodiment, a decrease in the outer diameter of saw blade 220 due to wear is reflected through a change in the amount of light received by receiver 230. Specifically, as blade 220 wears the amount of light 242 blocked by saw blade 220 decreases. As a result, the amount of light 244 received by receiver 230 necessarily increases and, as the electrical signal output by receiver 230 is related to the amount of light received, the electrical output signal likewise increases based on increased blade wear. In one exemplary embodiment, the output voltage of receiver 230 is linearly related to the wear of blade 220.

In the exemplary embodiment of FIG. 3, it is contemplated that the measurement range of wear measuring device 200 is about 10 millimeters, but not necessarily so limited. For example, the LX2 family of sensors manufactured by Keyence has measurement ranges of 1–30 millimeters. As shown in FIG. 3, wear measuring device 205 is disposed adjacent saw blade 220, the emitter portion 240 and receiver portion 230 being on opposite sides of saw blade 220. A processor 606 (shown in FIG. 6) may be coupled to receiver 230 for determining wear of saw blade 220 based on the output from receiver 230.

Figure 5:
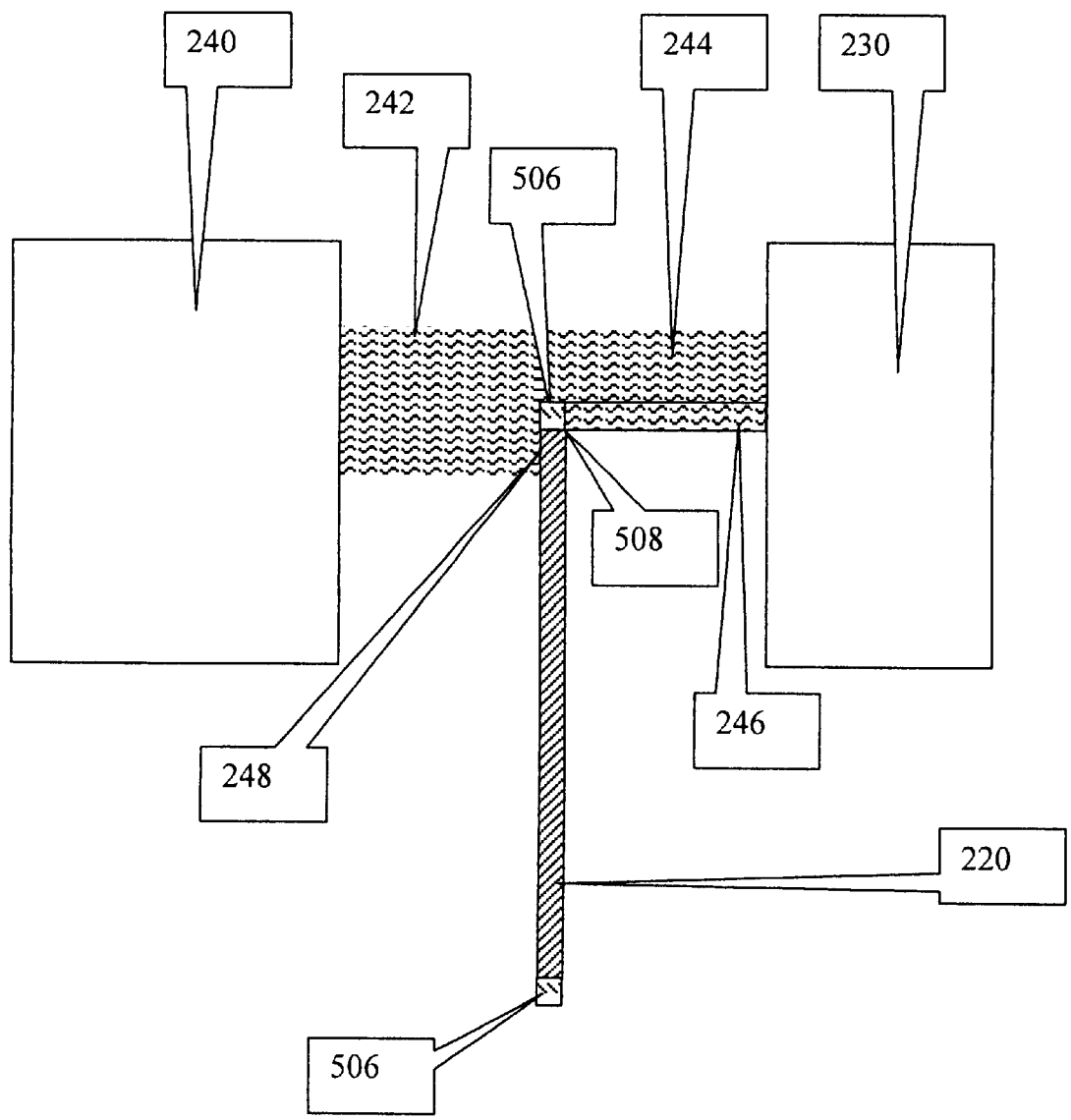
FIG. 5 is a diagram illustrating the details relating to determining saw blade wear according to an exemplary embodiment of the present invention.

The response of receiver 230 to light also enables monitoring of the blade wear relative to an initial blade position. This is illustrated in FIG. 5, in which light rays 242 from transmitter 240 are directed on the side 248 of saw blade 220. As shown in FIG. 5, initially, when saw blade 220 is new for example, more light 246 is blocked by edge 248 of saw blade 220, and less light 244 is incident on receiver 230. Receiver 230, in response to receiving these un-obscured light beams 244, produces an output signal based upon the amount of light received on the surface of receiver 230. In the case of a new blade this value may be stored in a memory, for example, in order to have a baseline for comparison.

Subsequently, after dicing at least a portion of the workpiece, saw blade 220 is once again measured to determine blade wear. In this case, assuming that saw blade 220 has become worn, edge 508 represents the present edge of saw blade 220, and 506 represents the portion of saw blade 220 which has been worn. As a result, an additional portion of light 246 is now incident on receiver 230, which in turn increases the value of the output signal from receiver 230. This output signal is then compared with the initial signal (representing a new blade) to determine blade wear.

Of course, in the event the blade exposure has not reached a minimum value, dicing operations may continue. If, on the other hand, the blade exposure meets or exceeds the minimum blade exposure requirements, the operator may be alerted to replace the blade with a new one, or to replace a flange with a smaller outer diameter in order to prevent damage to further processed substrates.

Figure 6:
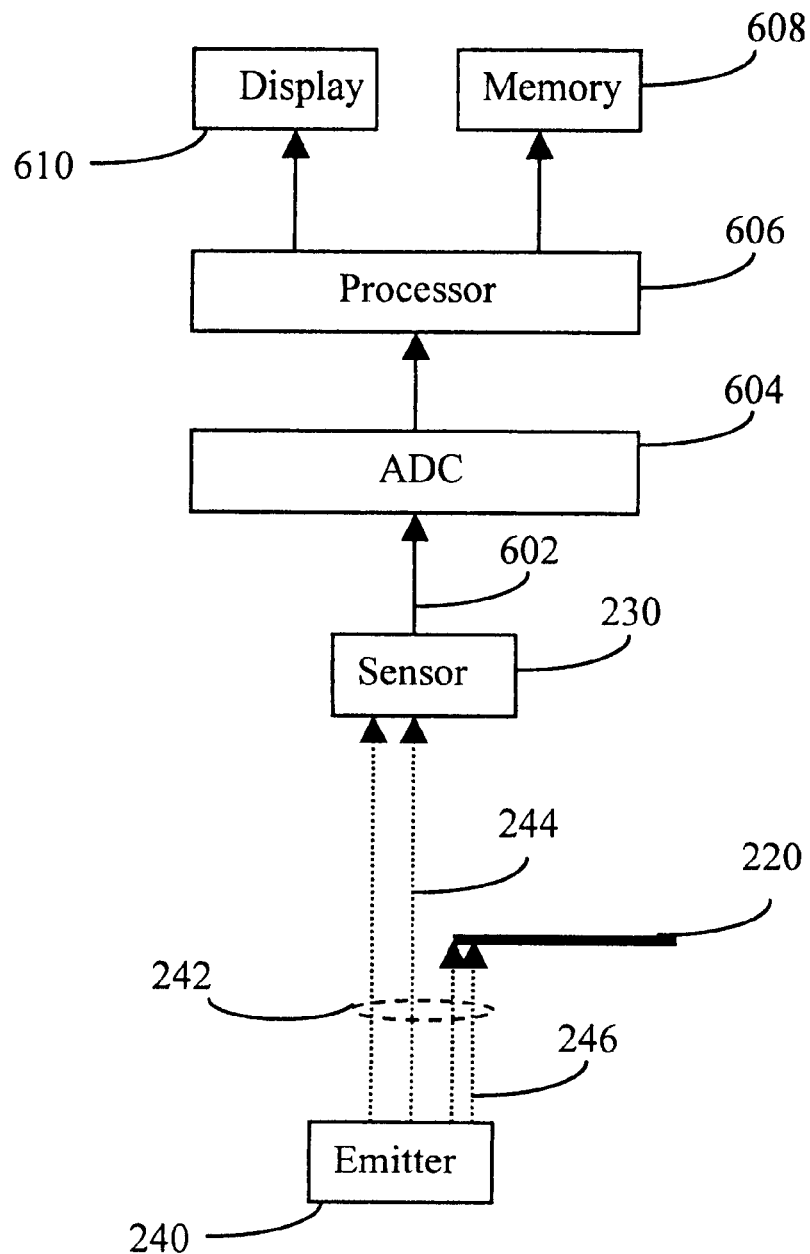
FIG. 6 is block diagram of a system according to an exemplary embodiment of the present invention.

FIG. 6 is a block diagram of an exemplary processing system according to the present invention. In FIG. 6, receiver 230 is coupled to converter 604 to convert the analog outputs 602 of receiver 230 into digital signals. These digital signals are in turn input into processor 606 for processing. Of course, in the event that receiver 230 provides a digital output signal, converter 604 may be eliminated. Processor 606 determines, in real time, the blade wear based on the information received from receiver 230 and the initial values stored in memory 608. Memory 608 may be any convention memory storage device or medium. It is also contemplated that the operator may enter the initial values into the system though conventional input devices such as a keyboard, mouse, network connection, or wireless means.

Referring again to FIG. 6, processor 606 may also be coupled to a display device 610 to display the results of the calculation, such as the present wear of the saw blade and wear rate, and provide guidance to the operator if the saw blade needs replacement. It is also contemplated that the processor may determine potential saw blade failure or life expectancy, based on historic information maintained in memory 608 when compared to measurement data for the saw blade. Likewise, this life expectancy may be displayed on display 610 and periodically updated by processor 606. Moreover, in terms of process control, a drastic change in saw blade wear indicates process failure, for example blade breakage.

Figure 4:
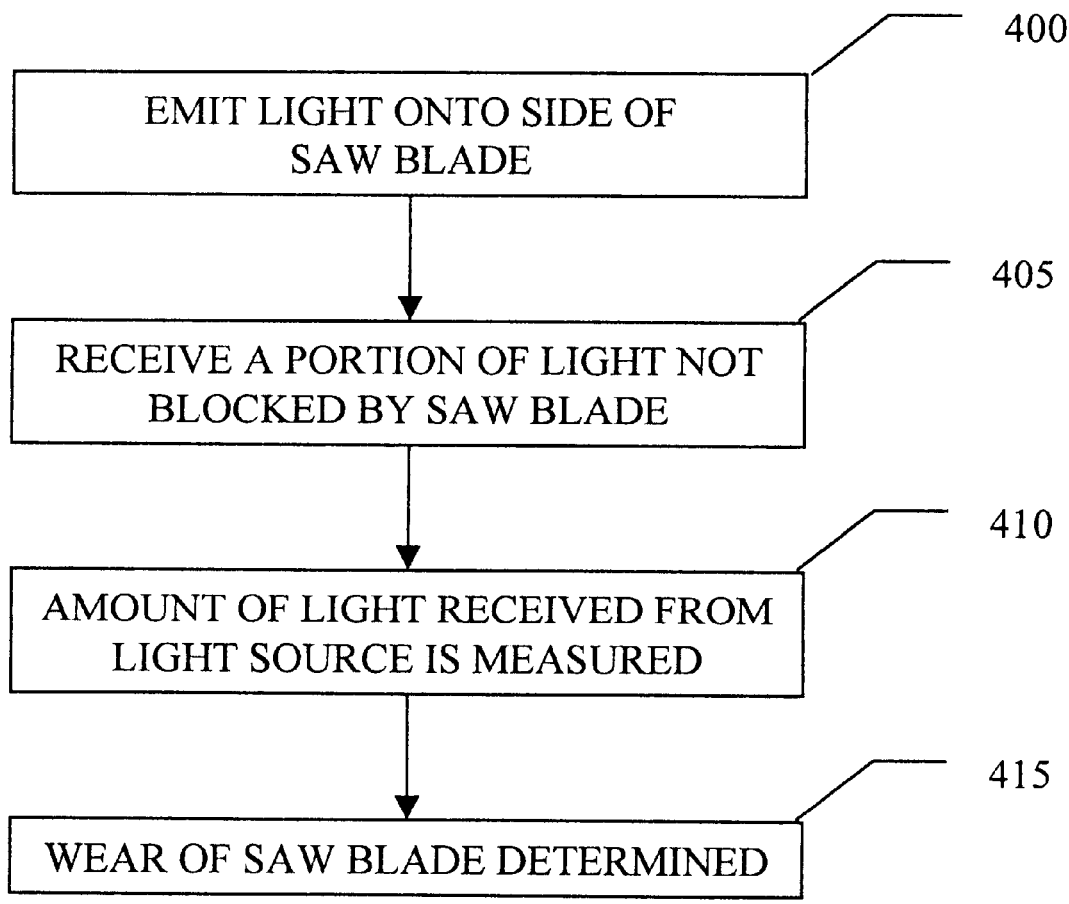
FIG. 4 is a flow chart illustrating a method for monitoring saw blade wear according to an exemplary embodiment of the present invention.

FIG. 4 is a flow chart illustrating the method of monitoring saw blade wear according to an exemplary embodiment of the present invention. At Step 400, light is emitted onto the side of saw blade 220. At Step 405, receiver 230 receives a portion of the light not blocked by saw blade 220. At Step 410, the amount of light received by receiver 230 is measured. At Step 415, the wear of saw blade 220 is determined based the amount of light incident of receiver 230, relative to previous reference measurement.

Although the invention has been described with reference to exemplary embodiments, it is not limited thereto. Rather, the appended claims should be construed to include other variants and embodiments of the invention which may be made by those skilled in the art without departing from the true spirit and scope of the present invention.

What is claimed:

1. A device for monitoring wear of dicing saw blade, the device comprising:
   a transmitter to emit light onto a side surface of the saw blade;
   a receiver mounted on one of a cooling block and a spindle of the saw blade for receiving at least a portion of the light from the transmitter not incident on the side of the saw blade, the portion of light received by the receiver based on the wear of the saw blade;
   a processor coupled to the receiver for determining the wear of the saw blade based on an output from the receiver, the processor generating successive wear data of the saw blade;
   a database for storing the successive wear data; and
   means for determining a predicted wear of the saw blade based on the successive wear data.

2. The device according to claim 1, wherein the processor determines the blade wear based on an intensity of light received by the receiver.

3. The device according to claim 1, wherein the processor provides a warning output based on a predicted wear of the saw blade.

4. The device according to claim 1, wherein the predicted wear of the blade is based on a comparison of the successive wear data stored in the database.

5. The device according to claim 1, wherein the transmitter is mounted adjacent one of i) the cooling block and ii) the spindle of the saw blade, and on a side of the saw blade opposite that of the receiver.

6. The device according to claim 1, wherein the light impacts the end of lade substantially parallel to an axis of the saw blade.

7. The device according to claim 1, wherein the light impacts the surface of t saw blade substantially orthogonal to a cutting edge of the saw blade.

8. The device according to claim 1, wherein the receiver comprises a element.

9. The device according to claim 1, further comprising an optical module positioned between the transmitter and the saw blade, wherein a light source emits a beam of light radiation and the optical module reforms the beam into a plurality of parallel beams, a portion of the plurality of beams being incident pn the receiver based on the wear of the blade.

10. The device according to claim 9, wherein the plurality of parallel beams form a light bundle having a substantially rectangular cross section.

11. The device according to claim 10, wherein a width of the cross section is about 1 mm and a height of the substantially rectangular cross section is about 10 mm.

12. The device according to claim 9, wherein the receiver produces an output based on the portion of the plurality of light beams received by the receiver.

13. The device according to claim 1, wherein the emitter is a laser diode.

14. The device according to claim 1, wherein the emitter provides a light output having a wavelength of between about 600 to 800 nm.

15. The device according to claim 1, further comprising a monitor for displaying at least one of i) a wear rate of the saw blade, and ii) an estimated time for replacement of the saw blade.

16. The device according to claim 1, wherein saw blade wear is determine real time.

17. The device according to claim 1, wherein a relative position between each of i) the saw blade, ii) the receiver and iii) the transmitter is fixed during both a dicing operation and wear monitoring.

18. A method for monitoring wear of a dicing saw blade having a cooling block and a spindle, the method comprising the steps of:
   providing a transmitter adjacent the saw blade;
   mounting a receiver one of the cooling block and the spindle of the saw blade;
   emitting light from the transmitter onto a side surface of the saw blade;
   receiving at least a portion of the light from the transmitter not incident on the side of the saw blade at the receiver;
   determining the wear of the saw blade based on the portion of light received; and
   displaying at least one of i) an estimated time for replacement of the saw blade, and ii) a predicted blade failure warning.

19. A device for monitoring wear of dicing saw blade, the device comprising:

means to emit light onto a side surface of the saw blade; and receiving means mounted on a cooling block of the saw blade for receiving a portion of the light from the light emitting means un-obscured by the saw blade;

processing means coupled to the receiving means for i) generating successive wear data of the saw blade and ii) determining the wear of the saw blade based on an output from the receiving means; and display means for displaying at least one of i) an estimated time for replacement of the saw blade, and ii) a predicted blade failure warning.

20. The device according to claim 19, further comprising memory means for storing the information displayed by the display means.

21. The device according to claim 19, further comprising memory means for predicting wear of the saw blade based on the successive wear data.

22. A device for monitoring wear of dicing saw blade, the device comprising:

a transmitter to emit light onto the saw blade; and a receiver for receiving at least a portion of the light from the transmitter not incident on the saw blade, the portion of light received by the receiver based on the wear of the saw blade;

a processor coupled to the receiver for generating successive wear data of the saw blade based on an output from the receiver; and a monitor for displaying an estimated time for replacement of the saw blade based on the successive wear data.

* * * * *